United States Patent
Chen et al.

(10) Patent No.: US 11,422,058 B2
(45) Date of Patent: Aug. 23, 2022

(54) DIGITAL LASER HOLOGRAPHY-BASED RAPID LENS CENTER OFFSET DETECTION DEVICE

(71) Applicant: GUANGZHOU BOSMA CORP, Guangdong (CN)

(72) Inventors: Yan Chen, Guangdong (CN); Xiaojin Yu, Guangdong (CN); Dexiang Zeng, Guangdong (CN)

(73) Assignee: GUANGZHOU BOSMA CORP, Guangzhou (CN)

( * ) Notice: Subject to any disclaimer, the term of this patent is extended or adjusted under 35 U.S.C. 154(b) by 395 days.

(21) Appl. No.: 16/618,414

(22) PCT Filed: Oct. 16, 2018

(86) PCT No.: PCT/CN2018/110361
§ 371 (c)(1),
(2) Date: Dec. 2, 2019

(87) PCT Pub. No.: WO2020/073346
PCT Pub. Date: Apr. 16, 2020

(65) Prior Publication Data
US 2021/0247267 A1 Aug. 12, 2021

(30) Foreign Application Priority Data

Oct. 11, 2018 (CN) .......................... 201811185951.5
Oct. 11, 2018 (CN) .......................... 201821650576.2

(51) Int. Cl.
*G01M 11/02* (2006.01)
*G03H 1/00* (2006.01)
*G03H 1/04* (2006.01)

(52) U.S. Cl.
CPC ...... *G01M 11/0221* (2013.01); *G03H 1/0005* (2013.01); *G03H 1/041* (2013.01); *G03H 1/0443* (2013.01); *G03H 2001/0033* (2013.01); *G03H 2001/0447* (2013.01); *G03H 2222/10* (2013.01)

(58) Field of Classification Search
CPC . G01M 11/0221; G03H 1/0005; G03H 1/041; G03H 1/0443; G03H 2001/0033; G03H 2001/0447; G03H 2222/10; G01B 9/02051; G01B 9/021
See application file for complete search history.

(56) References Cited

U.S. PATENT DOCUMENTS

| | | | | |
|---|---|---|---|---|
| 6,480,284 B1 * | 11/2002 | Stenton | ................ | G01B 9/021 356/458 |
| 7,440,115 B2 * | 10/2008 | Horwitz | ............... | A61B 3/1015 356/512 |
| 9,107,637 B2 * | 8/2015 | Ouchi | ..................... | G21K 1/06 |

FOREIGN PATENT DOCUMENTS

| | | | | |
|---|---|---|---|---|
| CN | 107339955 A | * | 11/2017 | ........... G01B 11/272 |
| JP | 2014190705 A | * | 10/2014 | ........ G01M 11/0257 |
| RU | 2658106 C1 | * | 6/2018 | |

* cited by examiner

Primary Examiner — Michael A Lyons

(57) ABSTRACT

The invention discloses a digital laser holography-based rapid lens center offset detection device, which relates to the technical field of lens detection and includes a spherical wave emission device, a reticle, a lens to be detected, an image sensor and a computer. The device is simple and stable in structure, and a complex optical receiving system and mechanical scanning are avoided. A detection method is high in efficiency and measurement accuracy, a process is simple, and a lens with an infinitely great focal length may be detected.

6 Claims, 5 Drawing Sheets

DIGITAL LASER HOLOGRAPHY-BASED RAPID LENS CENTER OFFSET DETECTION DEVICE

TECHNICAL FIELD

The invention relates to the technical field of lens detection, and more particularly, to a digital laser holography-based rapid lens center offset detection device and method.

BACKGROUND

Center offset, as an important factor influencing optical quality of a lens assembly, may damage coaxiality of an optical system to cause imaging astigmatism and distortion asymmetry, thereby reducing imaging quality.

At present, reflection and transmission methods are mainly adopted to detect a center offset of an optical lens. Basic principles of the two are consistent, mainly as follows. Parallel light is emitted to a lens to be detected, and an image point is detected by use of an imaging Charge Coupled Device (CCD). Then, the lens to be detected is rotated. If the lens to be detected has the center offset, a trajectory of the image point may form a circular ring with a certain radius. Since a diameter of the circular ring forms a corresponding geometrical relationship with the center offset of the lens to be detected, the center offset of the lens to be detected may be reversely calculated.

A focal length of the lens to be detected ranges widely and a clear image is required to be formed on a CCD detector, so that an optical receiving system is required to have a positively and negatively infinite zoom range that is practically impossible.

SUMMARY

For the problem in the Background, the invention provides a digital laser holography-based rapid lens center offset detection device and method. The device is simple and stable in structure, and a complex optical receiving system and mechanical scanning are avoided. The detection method is high in efficiency and measurement accuracy, a process is simple, and a lens with an infinitely great focal length may be detected.

In order to achieve the above purpose, the invention discloses a digital laser holography-based rapid lens center offset detection device, which may include a spherical wave emission device, a reticle, a lens to be detected, an image sensor and a computer, wherein the reticle and the image sensor may be sequentially arranged at a rear end of the spherical wave emission device to form a spherical wave, diffract the spherical wave through the reticle and acquire a hologram formed by interference superposition of a diffracted wave and a reference light wave that does not change; the lens to be detected may be arranged between the reticle and the image sensor, and a distance between the reticle and the lens to be detected may be regulated to detect a center offset of the lens; and an output end of the image sensor may be connected with an input end of the computer.

Preferably, the spherical wave emission device may include a semiconductor laser, an optical fiber collimator, a lens and a pinhole plate, the semiconductor laser, the optical fiber collimator and the lens may be sequentially arranged at the front end of the pinhole plate, and generated laser may be coupled through the optical fiber collimator and then focused to a pinhole through the lens to form a point light source to emit the spherical wave.

Preferably, the computer may reconstruct a reticle image through a convolution method.

Preferably, the semiconductor laser may adopt a 405 nm semiconductor laser.

Preferably, the spherical wave emission device, the reticle, the lens to be detected and the image sensor may be on the same axis.

Preferably, a distance between the lens to be detected and the pinhole may be less than a focal length of the lens to be detected.

The invention also discloses a detection method implemented by a digital laser holography-based rapid lens center offset detection device, which includes the following steps:

S10: a spherical wave is generated;

S20: the spherical wave is diffracted through a reticle, and a hologram is formed by interference superposition of a diffracted wave and an original light wave that does not change;

S30: the hologram is acquired through an image sensor, and a reticle image is reconstructed; and S40: a lens to be detected is arranged between the reticle and the image sensor, and a distance between the reticle and the lens to be detected is regulated to detect a center offset of the lens.

Preferably, the operation in S10 that the spherical wave is generated is specifically implemented by the following steps:

S101: a laser is started, and an emitted laser is coupled through an optical fiber collimator; and S102: the laser is focused to a pinhole through a lens to form a point light source to emit the spherical wave.

Preferably, the operation in S40 that the distance between the reticle and the lens to be detected is regulated to detect the center offset of the lens includes:

S401: the reticle is horizontally moved to a direction of the lens to be detected, and a reticle image is simultaneously reconstructed to ensure that the image and the reticle image reconstructed before movement are on the same reticle reconstruction plane;

S402: when the reticle image formed through the lens to be detected is at a position of the reticle that is not moved, the reticle is stopped to be moved, and a movement distance of the reticle is recorded; and S403: the center offset of the lens to be detected is obtained according to a lens imaging principle in combination with the movement distance, a focal length of the lens to be detected and movement distances of the two images reconstructed before and after movement.

Preferably, the operation in S403 that the center offset of the lens to be detected is obtained according to the lens imaging principle in combination with the movement distance, the focal length of the lens to be detected and the movement distances of the two images reconstructed before and after movement is specifically as follows:

the center offset of the lens is:

$$h = \frac{2f + d - \sqrt{4fd + d^2}}{\sqrt{4fd + d^2} - d} h', \qquad (1)$$

where h represents the center offset of the lens to be detected, f represents the focal length of the lens to be detected, h' represents a vertical distance between the reticle and the image thereof, and d represents the movement distance of the reticle to the direction of the lens to be detected.

According to the digital laser holography-based rapid lens center offset detection device and method disclosed in the invention, a digital laser holographic micro-display technology is utilized, so that not only may amplitude and phase information of an object be reconstructed, but also position information of the object may be accurately measured to accurately measure the center offset of the lens in combination with a real-time imaging characteristic of a CCD; the device is simple and stable in structure, and a complex optical receiving system and mechanical scanning are avoided; and the detection method is high in efficiency and measurement accuracy, a process is simple, and a lens with an infinitely great focal length may be detected.

BRIEF DESCRIPTION OF THE DRAWINGS

In order to describe the technical solutions in embodiments of the invention or a conventional art more clearly, the drawings required to be used for descriptions about the embodiments or the conventional art will be simply introduced below. It is apparent that the drawings described below are only some embodiments of the invention. Those of ordinary skill in the art may further obtain other drawings according to the structures shown in these drawings without creative work.

DESCRIPTIONS ABOUT THE REFERENCE SIGNS

Figure 1:
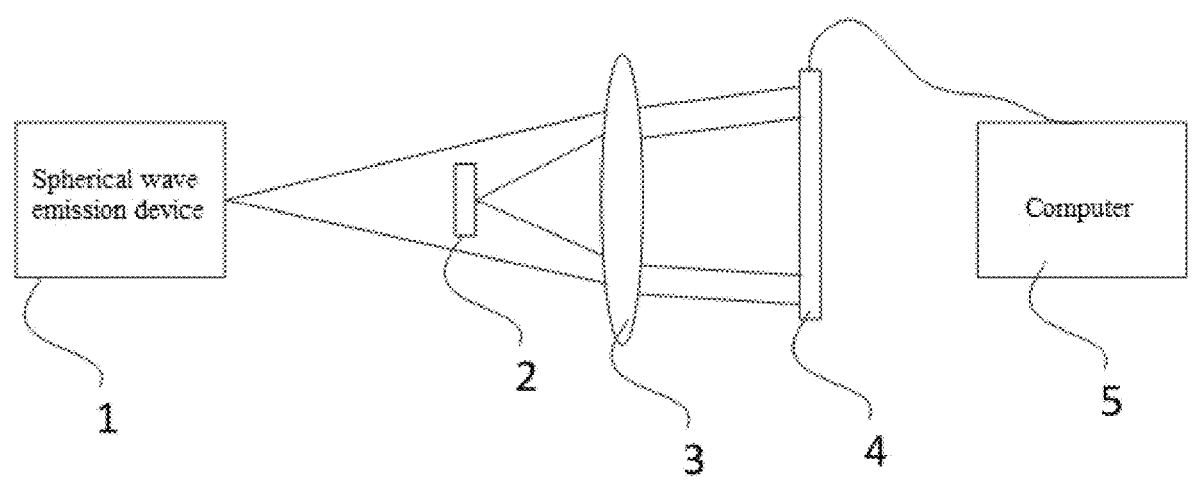
FIG. 1 is a structure diagram of a digital laser holography-based rapid lens center offset detection device according to a first embodiment of the invention.

1—spherical wave emission device; 2—reticle; 3—lens to be detected; 4—image sensor; 5—computer; 6—mechanical axis; 7—optical axis; 101—semiconductor laser; 102—optical fiber collimator; 103—lens; and 104—pinhole plate.

Implementation of the purpose, functional characteristics and advantages of the invention will further be described in combination with the embodiments and reference to the drawings.

DETAILED DESCRIPTION OF THE EMBODIMENTS

The technical solutions in embodiments of the invention will be clearly and completely described below in combination with the drawings in the embodiments of the invention. It is apparent that the described embodiments are not all the embodiments but only part of the embodiments of the invention. All other embodiments obtained by those of ordinary skill in the art based on the embodiments in the invention without creative work shall fall within the scope of protection of the invention.

It is to be noted that, if a direction indication (for example, upper, lower, left, right, front and rear . . . ) is involved in the embodiments of the invention, the direction indication is only adopted to explain a relative position relationship, movement condition and the like between each part under a specific pose (shown in the drawings), and if the specific pose changes, the direction indication also correspondingly changes.

In addition, if descriptions like "first", "second" and the like are involved in the embodiments of the invention, the descriptions like "first", "second" and the like are only for the purpose of description and may not be understood to indicate or imply relative importance or implicitly indicate the number of indicated technical characteristics. Therefore, a characteristic defined by "first" and "second" may explicitly or implicitly indicate inclusion of at least one such characteristic. Moreover, the technical solutions of each embodiment may be combined if the combinations may be implemented by those of ordinary skill in the art, and if a combination of the technical solutions has a conflict or may not be implemented, the combination of the technical solutions should be considered not to exist and also not fall within the scope of protection of the invention.

The invention discloses a digital laser holography-based rapid lens center offset detection device.

In a first preferred embodiment of the invention, as shown in FIG. 1, the device includes a spherical wave emission device 1, a reticle 2, a lens to be detected 3, an image sensor 4 and a computer 5. The spherical wave emission device 1, the reticle 2, the lens to be detected 3 and the image sensor 4 are on the same axis. The reticle 2 and the image sensor 4 are sequentially arranged at a rear end of the spherical wave emission device 1, a formed spherical wave is diffracted through the reticle, and a hologram formed by interference superposition of a diffracted wave and a reference light wave that does not change is acquired through the image sensor 4. The lens to be detected 3 is arranged between the reticle 2 and the image sensor 4, a distance s between the lens to be detected and a pinhole is less than a focal length f of the lens to be detected, and a distance between the reticle 2 and the lens to be detected 3 is regulated to detect a center offset of the lens to be detected 3. An output end of the image sensor 4 is connected with an input end of the computer 5, and the computer reconstructs a reticle image through a convolution method.

Figure 2:
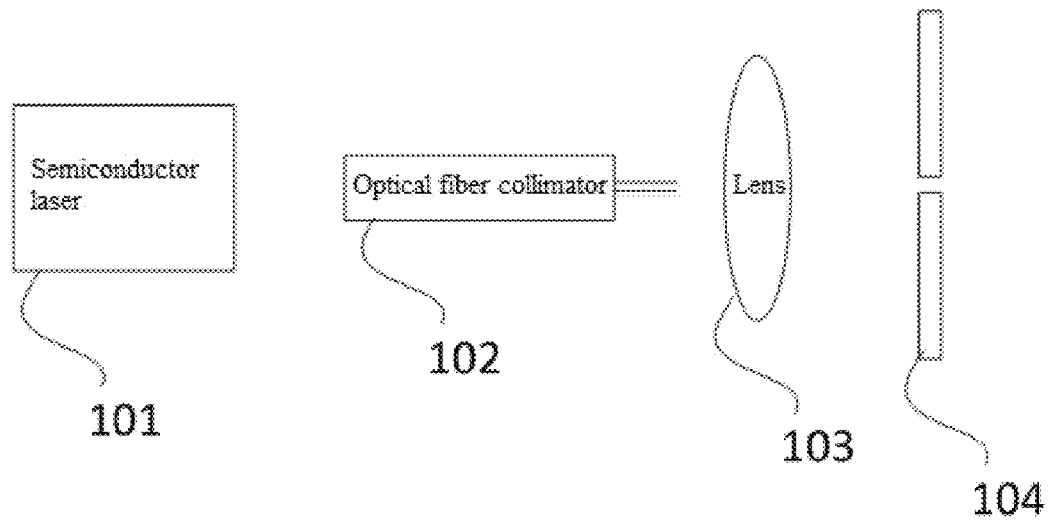
FIG. 2 is a structure diagram of a spherical wave emission device according to a second embodiment of the invention.

In a second preferred embodiment of the invention, as shown in FIG. 2, the spherical wave emission device 1 includes a semiconductor laser 101, an optical fiber collimator 102, a lens 103 and a pinhole plate 104. The semiconductor laser 101 adopts a 405 nm semiconductor laser.

The semiconductor laser 101, the optical fiber collimator 102 and the lens 103 are sequentially arranged at a front end of the pinhole plate 104 to couple generated laser into the optical fiber collimator and focus it to the pinhole through the lens to form a point light source to emit the spherical wave.

Figure 3:
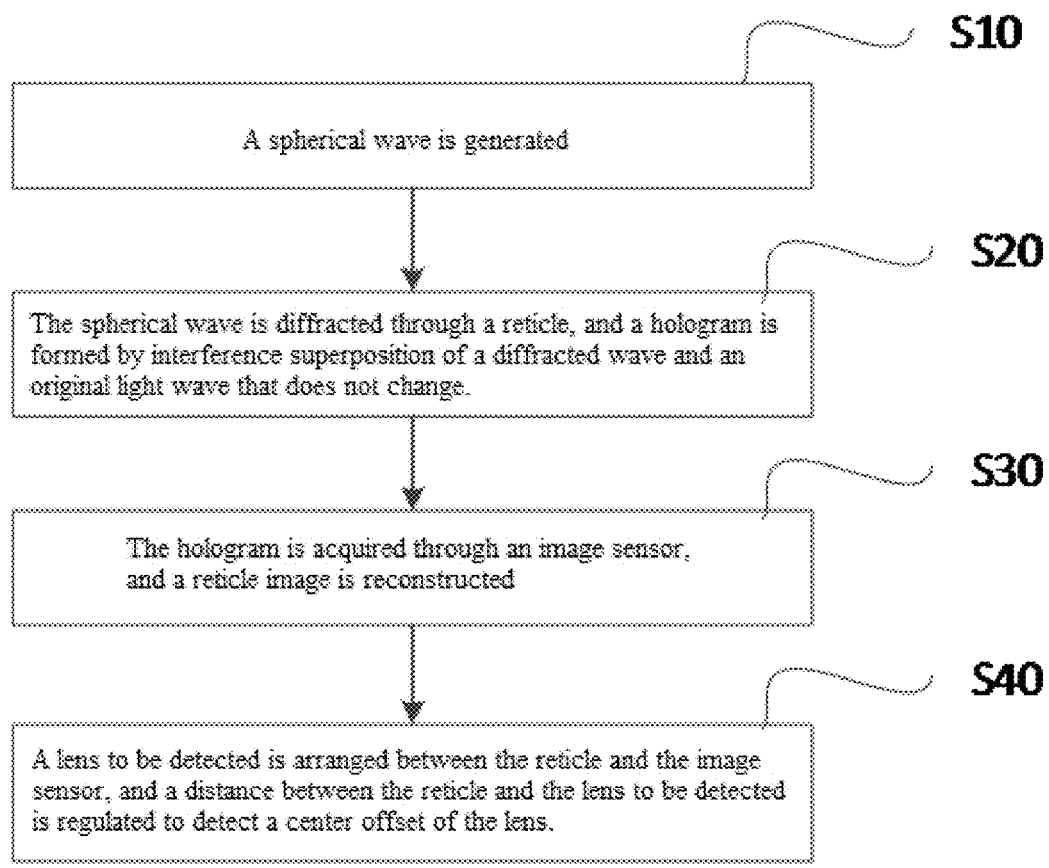
FIG. 3 is a flowchart of a detection method implemented by a digital laser holography-based rapid lens center offset detection device according to a third embodiment of the invention.

In a third preferred embodiment of the invention, a detection method implemented by a digital laser holography-based rapid lens center offset detection device, as shown in FIG. 3, includes the following steps.

In S10, a spherical wave is generated.

Figure 4:
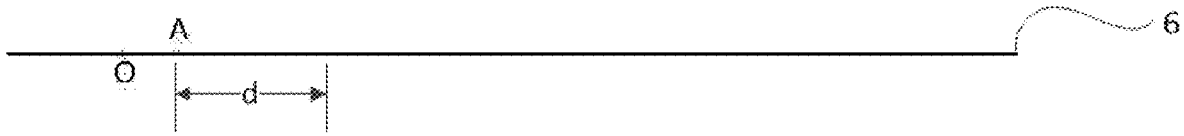
FIG. 4 is a schematic diagram of a position of a reticle before movement according to a preferred embodiment of the invention.

In S20, the spherical wave is diffracted through a reticle (shown as point A in FIG. 4, the horizontal line in the figure is a mechanical axis 6), and a hologram is formed by interference superposition of a diffracted wave and an original light wave that does not change.

In S30, the hologram is acquired through an image sensor, and a reticle image is reconstructed through a convolution method.

In S40, a lens to be detected is arranged between the reticle and the image sensor, and a distance between the reticle and the lens to be detected is regulated to detect a center offset of the lens.

Figure 5:
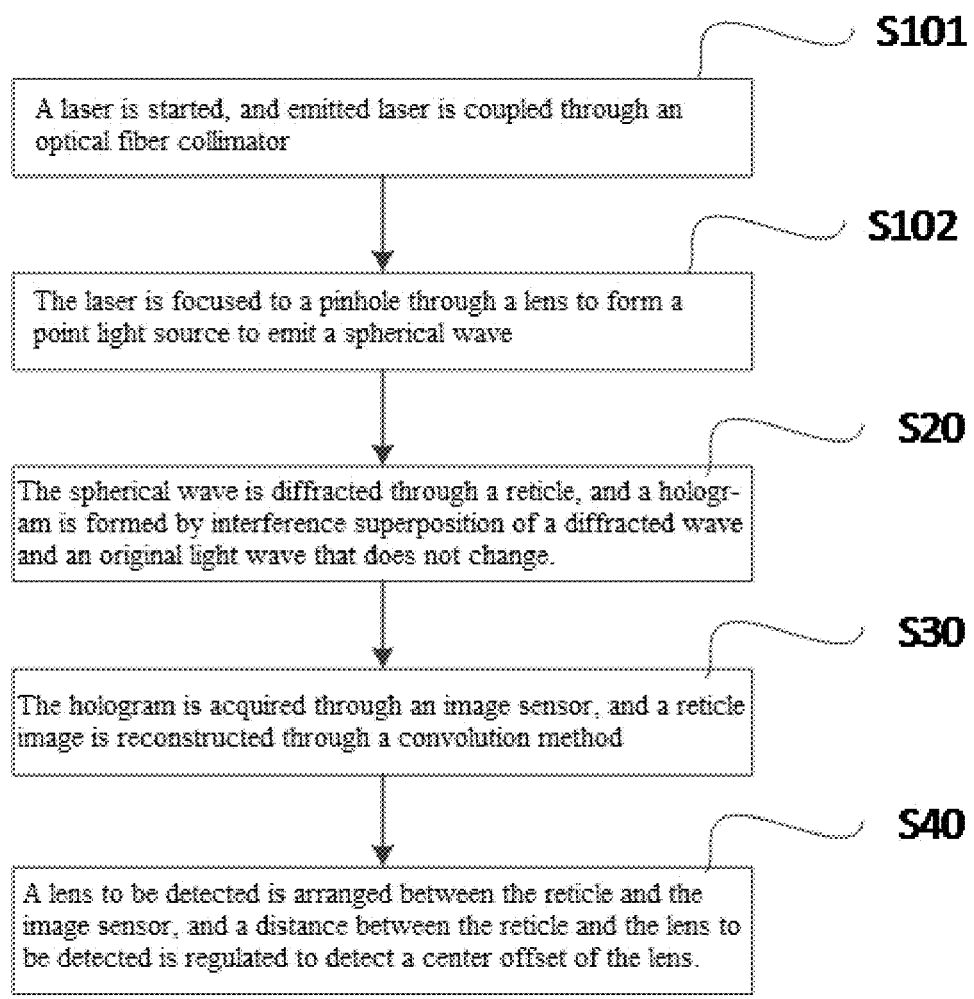
FIG. 5 is a flowchart of a detection method implemented by a digital laser holography-based rapid lens center offset detection device according to a fourth embodiment of the invention.

In a fourth preferred embodiment of the invention, a detection method implemented by a digital laser holography-based rapid lens center offset detection device, as shown in FIG. 5, includes the following steps.

In S101, a laser is started, and an emitted laser is coupled through an optical fiber collimator.

In S102, the laser is focused to a pinhole through a lens to form a point light source to emit a spherical wave.

In S20, the spherical wave is diffracted through a reticle (shown as point A in FIG. 4), and a hologram is formed by interference superposition of a diffracted wave and an original light wave that does not change.

In S30, the hologram is acquired through an image sensor, and a reticle image is reconstructed through a convolution method.

In S40, a lens to be detected is arranged between the reticle and the image sensor, and a distance between the reticle and the lens to be detected is regulated to detect a center offset of the lens.

Figure 6:
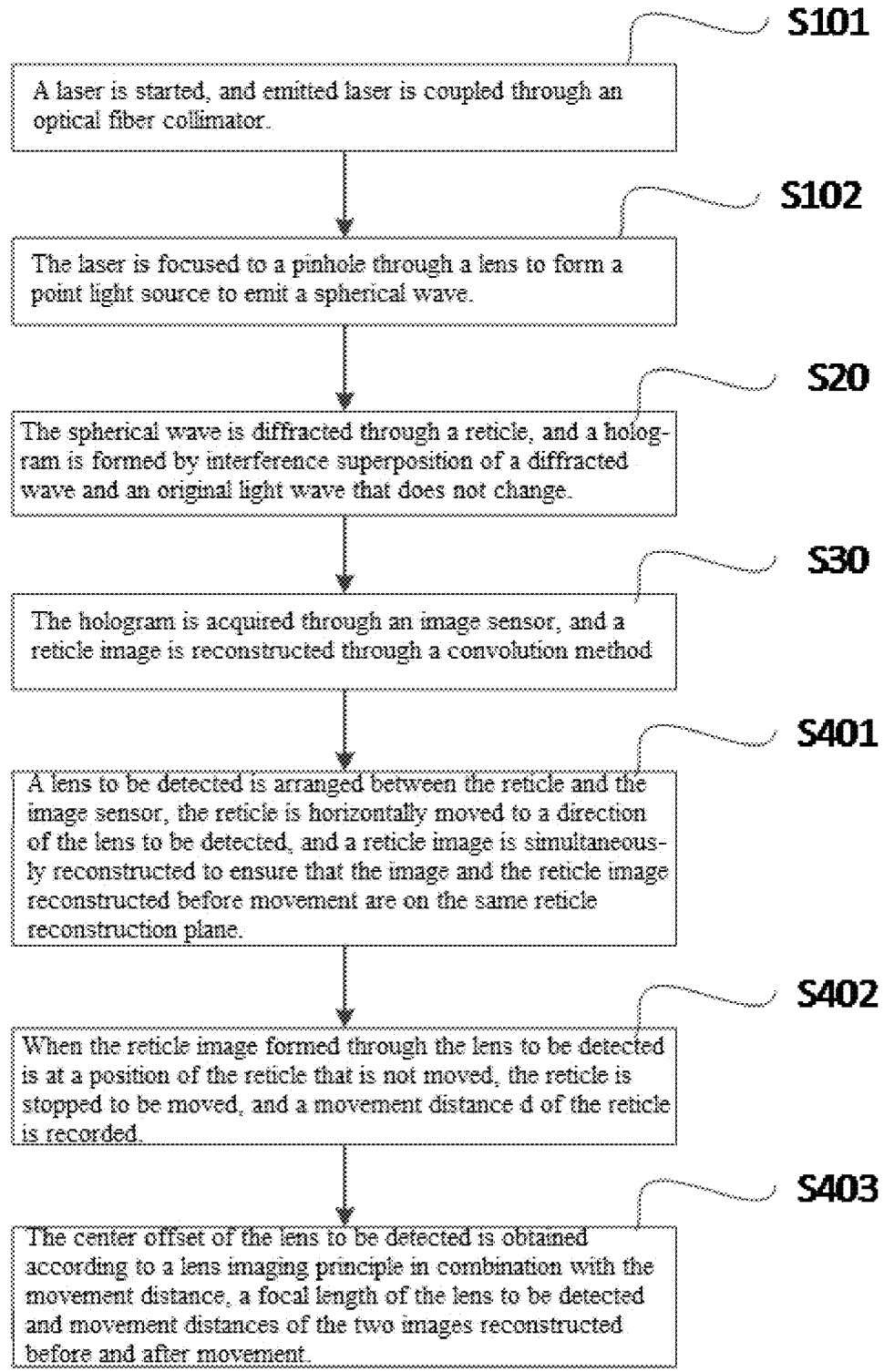
FIG. 6 is a flowchart of a detection method implemented by a digital laser holography-based rapid lens center offset detection device according to a fifth embodiment of the invention.

In a fifth preferred embodiment of the invention, a detection method implemented by a digital laser holography-based rapid lens center offset detection device, as shown in FIG. 6, includes the following steps.

In S101, a laser is started, and an emitted laser is coupled through an optical fiber collimator.

In S102, the laser is focused to a pinhole through a lens to form a point light source to emit a spherical wave.

In S20, the spherical wave is diffracted through a reticle (shown as point A in FIG. 4), and a hologram is formed by interference superposition of a diffracted wave and an original light wave that does not change.

In S30, the hologram is acquired through an image sensor, and a reticle image is reconstructed through a convolution method.

In S401, a lens to be detected is arranged between the reticle and the image sensor (a distance s between the lens to be detected and the pinhole is less than a focal length f of the lens to be detected), the reticle is horizontally moved to a direction of the lens to be detected (the reticle is ensured to be located between the pinhole and the lens to be detected), and a reticle image is simultaneously reconstructed to ensure that the image and the reticle image reconstructed before movement are on the same reticle reconstruction plane.

Figure 7:
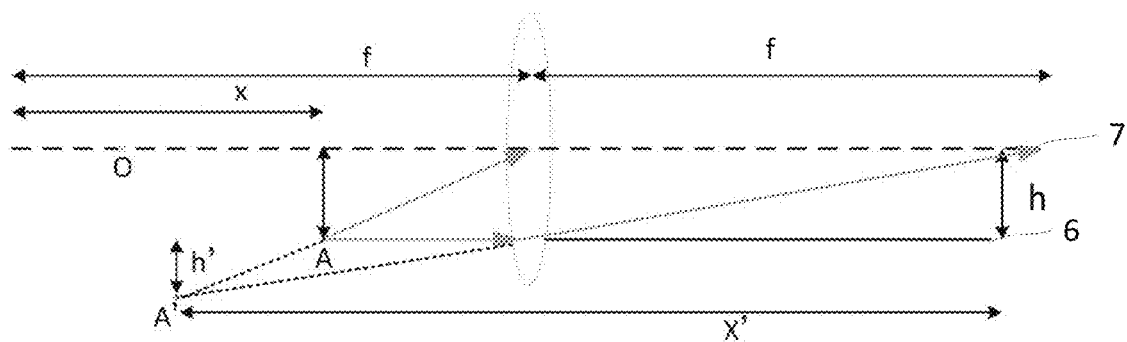
FIG. 7 is a schematic diagram of a relationship between an image, formed through a lens to be detected, and position of a reticle according to a preferred embodiment of the invention.

In S402, when the reticle image (shown as A' in FIG. 7, in FIG. 7, 7 is an optical axis and 6 is a mechanical axis) formed through the lens to be detected is at a position (shown as point A in FIG. 4) of the reticle that is not moved, the reticle is stopped to be moved, and a movement distance d of the reticle is recorded.

In S403, the center offset of the lens to be detected is obtained according to a lens imaging principle in combination with the movement distance, a focal length of the lens to be detected and movement distances of the two images reconstructed before and after movement.

In a sixth preferred embodiment of the invention, a detection method implemented by a digital laser holography-based rapid lens center offset detection device includes the following steps.

In S101, a laser is started, and an emitted laser is coupled through an optical fiber collimator.

S102: the laser is focused to a pinhole through a lens to form a point light source to emit the spherical wave.

In S20, the spherical wave irradiates a reticle (shown as point A in FIG. 4) and is diffracted, and a hologram is formed by interference superposition of a diffracted wave and an original light wave that does not change.

In S30, the hologram is acquired through an image sensor, and a reticle image is reconstructed through a convolution method.

In S401, a lens to be detected is arranged between the reticle and the image sensor (a distance s between the lens to be detected and the pinhole is less than a focal length f of the lens to be detected), the reticle is horizontally moved to a direction of the lens to be detected (the reticle is ensured to be located between the pinhole and the lens to be detected), and a reticle image is simultaneously reconstructed to ensure that the image and the reticle image reconstructed before movement are on the same reticle reconstruction plane.

In S402, when the reticle image (shown as A' in FIG. 7) formed through the lens to be detected is at a position (shown as point A in FIG. 4) of the reticle that is not moved, the reticle is stopped to be moved, and a movement distance d of the reticle is recorded.

In S403, the center offset of the lens to be detected is obtained according to a lens imaging principle in combination with the movement distance, a focal length of the lens to be detected and movement distances of the two images reconstructed before and after movement.

In the embodiment of the invention, if the lens to be detected has the center offset, the reticle image formed through the lens changes, and the movement distances h' of the two reconstructed images may be compared to judge whether the lens to be detected has the problem of the center offset or not.

Through the lens imaging principle, it may be seen that:

$$f^2 = xx' \qquad (2),$$

where f represents the focal length of the lens to be detected, x represents an object distance, and x' represents an image distance; and $$\frac{h' + h}{h} = \frac{f}{x}, \qquad (3)$$

where h represents the center offset of the lens to be detected, and h' represents a vertical distance between the reticle and the image thereof.

From FIG. 7, it may be seen that:

$$x'=f+(f-x)+d \quad (4),$$

where d represents the movement distance of the reticle to the direction of the lens to be detected, and $$f>x.$$

From the above, it may be seen that the center offset of the lens is:

$$h = \frac{2f + d - \sqrt{4fd + d^2}}{\sqrt{4fd + d^2} - d} h'. \quad (1)$$

Figure 8:
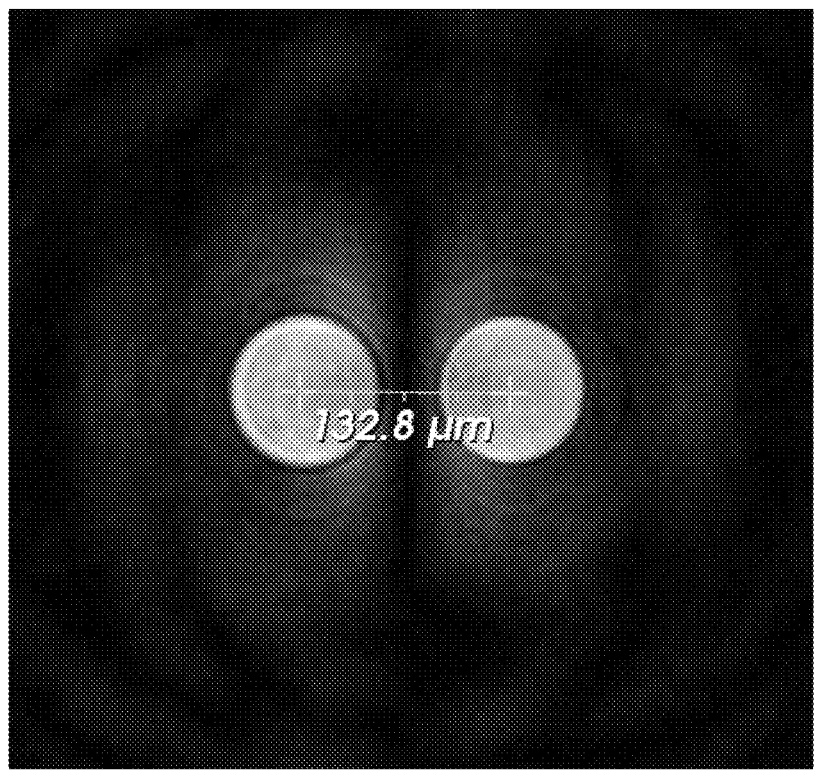
FIG. 8 is a schematic diagram of a movement distance of a calibration point in a reticle according to a preferred embodiment of the invention.

In the embodiment of the invention, the movement distance h' of a calibration point in the reticle in FIG. 8 is about 132.8 μm. The focal length f of the lens to be detected is 13.2 mm, the movement distance d of the reticle is 5 mm, and through the following formula, the center offset of the lens may be calculated to be 0.17 mm.

In the descriptions about the implementation modes of the invention, it is to be noted that descriptions about any process or method described in the flowcharts or described in another manner herein may be understood as modules, segments or parts representing codes including one or more executable instructions configured to realize specific logical functions or processes. Moreover, the scope of the implementation modes of the invention includes other implementations, the functions may be executed according to sequences different from the shown or discussed sequences, including a basically concurrent manner or an opposite sequence for the involved functions, and this should be understood by those skilled in the art of the embodiments of the invention.

The above is only the preferred embodiment of the invention and not thus intended to limit the patent scope of the invention. Any equivalent structure transformations made under the inventive concept of the invention by use of the contents in the specification and drawings of the invention or direct/indirect application thereof to other related technical fields shall fall within the patent protection scope of the invention.

The invention claimed is:

1. A digital laser holography-based rapid lens center offset detection device, comprising a spherical wave emission device, a reticle, a lens to be detected, an image sensor and a computer, wherein
   the reticle and the image sensor are sequentially arranged at a rear end of the spherical wave emission device, a spherical wave formed by the spherical wave emission device is diffracted through the reticle, and a hologram formed by interference superposition of a diffracted wave and a reference light wave that does not change is acquired through the image sensor; the lens to be detected is arranged between the reticle and the image sensor, and a distance between the reticle and the lens to be detected is regulated to detect a center offset of the lens; and an output end of the image sensor is connected with an input end of the computer.

2. The digital laser holography-based rapid lens center offset detection device as claimed in claim 1, wherein the spherical wave emission device comprises a semiconductor laser, an optical fiber collimator, a lens and a pinhole plate,
   the semiconductor laser, the optical fiber collimator and the lens are sequentially arranged at a front end of the pinhole plate, and laser emitted by the semiconductor laser is coupled into the optical fiber collimator and then focused to the pinhole plate through the lens to form a point light source to emit the spherical wave.

3. The digital laser holography-based rapid lens center offset detection device as claimed in claim 2, wherein the semiconductor laser is a 405 nm semiconductor laser.

4. The digital laser holography-based rapid lens center offset detection device as claimed in claim 2, wherein a distance between the lens to be detected and a pinhole of the pinhole plate is less than a focal length of the lens to be detected.

5. The digital laser holography-based rapid lens center offset detection device as claimed in claim 1, wherein the computer reconstructs a reticle image through a convolution method.

6. The digital laser holography-based rapid lens center offset detection device as claimed in claim 1, wherein the spherical wave emission device, the reticle, the lens to be detected and the image sensor are on the same axis.

* * * * *